United States Patent
Tinskey et al.

(10) Patent No.: US 10,896,417 B2
(45) Date of Patent: Jan. 19, 2021

(54) WIRELESS PAYMENT TRANSACTIONS IN A VEHICLE ENVIRONMENT

(71) Applicant: FORD GLOBAL TECHNOLOGIES, LLC, Dearborn, MI (US)

(72) Inventors: Michael Robert Tinskey, Commerce, MI (US); Michael Seneski, Birmingham, MI (US); Brian Walter, Dexter, MI (US); Robert P. Eaton, Birmingham, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 668 days.

(21) Appl. No.: 15/092,031

(22) Filed: Apr. 6, 2016

(65) Prior Publication Data

US 2017/0293910 A1  Oct. 12, 2017

(51) Int. Cl.
*G06Q 20/32* (2012.01)
*G06Q 20/02* (2012.01)
*G06Q 20/36* (2012.01)
*G06Q 20/40* (2012.01)

(52) U.S. Cl.
CPC ......... *G06Q 20/327* (2013.01); *G06Q 20/023* (2013.01); *G06Q 20/3224* (2013.01); *G06Q 20/3674* (2013.01); *G06Q 20/40145* (2013.01); *G06Q 2240/00* (2013.01)

(58) Field of Classification Search
CPC ......... G06Q 20/3224; G06Q 20/40145; G06Q 2240/00; G06Q 30/02; G06Q 30/0271; G06Q 30/0236; G06Q 20/401; G06Q 20/3276; G06Q 20/32; G06Q 20/40
See application file for complete search history.

(56) References Cited

U.S. PATENT DOCUMENTS

| | | | | |
|---|---|---|---|---|
| 5,781,912 A | * | 7/1998 | Demers | G06F 11/1474 707/634 |
| 5,867,802 A | * | 2/1999 | Borza | G07C 9/37 340/5.53 |
| 6,711,474 B1 | | 3/2004 | Treyz et al. | |
| 6,832,719 B2 | * | 12/2004 | DeVries, Jr. | B60R 1/12 235/379 |
| 7,447,642 B2 | | 11/2008 | Bodin | |
| 8,666,801 B2 | | 3/2014 | Cho | |
| 2002/0049535 A1 | | 4/2002 | Rigo et al. | |
| 2003/0130938 A1 | * | 7/2003 | Wolfston, Jr. | G06Q 20/02 705/39 |

(Continued)

Primary Examiner — Johann Y Choo
(74) Attorney, Agent, or Firm — Michael J. Spenner; Brooks Kushman P.C.

(57) ABSTRACT

A wireless transaction request may be received by a vehicle from a retailer. The vehicle may validate that the vehicle is located in proximity to the retailer and may receive confirmation of the request from a vehicle occupant. The vehicle may also initiate a payment for the transaction with a server, responsive to the confirmation of the request and validation of the vehicle location. Communications between the vehicle and the retailer may be performed using Dedicated Short Range Communications (DSRC). The identity of the vehicle occupant may be confirmed using biometric sensors. The payment transaction may be performed using the Automated Clearing House (ACH) electronic network to avoid credit card interchange fees.

11 Claims, 3 Drawing Sheets

(56) References Cited

U.S. PATENT DOCUMENTS

| | | | |
|---|---|---|---|
| 2004/0041689 A1* | 3/2004 | DeBono | B60R 25/066 340/5.52 |
| 2004/0093155 A1* | 5/2004 | Simonds | B60R 16/0231 701/532 |
| 2004/0230480 A1 | 11/2004 | Kanayama | |
| 2004/0260652 A1* | 12/2004 | Rose | G06Q 20/0855 705/51 |
| 2008/0255948 A1* | 10/2008 | Garner | G06Q 30/00 705/14.1 |
| 2009/0024525 A1* | 1/2009 | Blumer | G06Q 20/10 705/41 |
| 2009/0040306 A1* | 2/2009 | Foote | B60R 1/082 348/148 |
| 2010/0280956 A1* | 11/2010 | Chutorash | G06Q 20/202 705/64 |
| 2011/0136429 A1* | 6/2011 | Ames | H04B 5/02 455/41.1 |
| 2012/0323690 A1* | 12/2012 | Michael | G06Q 30/02 705/14.58 |
| 2013/0282283 A1* | 10/2013 | Bondesen | H04W 4/024 701/537 |
| 2014/0188699 A1* | 7/2014 | Langgood | G06F 17/00 705/39 |
| 2014/0316685 A1 | 10/2014 | Povolny et al. | |
| 2015/0058224 A1* | 2/2015 | Gaddam | G06Q 20/40 705/44 |
| 2015/0095190 A1 | 4/2015 | Hammad et al. | |
| 2015/0149465 A1* | 5/2015 | Unser | G06F 16/25 707/738 |
| 2015/0161578 A1 | 6/2015 | Ahmed et al. | |
| 2015/0220916 A1* | 8/2015 | Prakash | G06Q 20/36 705/41 |
| 2016/0019526 A1 | 1/2016 | Granbery et al. | |

* cited by examiner

WIRELESS PAYMENT TRANSACTIONS IN A VEHICLE ENVIRONMENT

TECHNICAL FIELD

Aspects of the disclosure generally relate to wireless payment transactions performed using a vehicle.

BACKGROUND

Consumers continue to migrate from traditional payment methods, such as checks and cash, to electronic payments and credit cards. Digital wallet services continue to propagate in an effort to capture the consumer transactions. Despite the existence of numerous mobile wallets provided by merchants, banks, and telecom providers, no single entity has gained significant traction in the marketplace. At the same time, merchants that accept credit card payments pay credit card processing fees that can range up to four percent, including significant interchange fees.

SUMMARY

In an illustrative embodiment, a vehicle includes an embedded modem for communication with a wallet server; a wireless transceiver for communication with a retailer; and a processor programmed to receive a wireless transaction request from the retailer, validate that the vehicle is located in proximity to the retailer, receive confirmation of the request from a vehicle occupant, and initiate a payment for the transaction with the server, responsive to the confirmation of the request and validation of the vehicle location.

In another illustrative embodiment, a method includes receiving, by a wallet server, a payment transaction for a purchase by an occupant of a vehicle at a retailer, the transaction being initiated via Dedicated Short Range Communications (DSRC) between the vehicle and the retailer; performing a first transaction to debit the occupant; performing a second transaction to credit the retailer; and updating an account of the occupant based on the transaction.

In a further illustrative embodiment, a non-transitory computer-readable medium, includes instructions that, when executed by a processor of a vehicle, are configured to cause the processor to receive a wireless transaction request from a retailer over a Dedicated Short Range Communication (DSRC) channel; validate that the vehicle is located in proximity to the retailer according to global navigation satellite system (GNSS) location data and an identified location of the retailer; receive confirmation of the request from a vehicle occupant by confirming at least one biometric of the occupant; and initiate payment for the transaction performed using the Automated Clearing House (ACH) electronic network with a remote server, responsive to the confirmation of the request and validation of the vehicle location.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
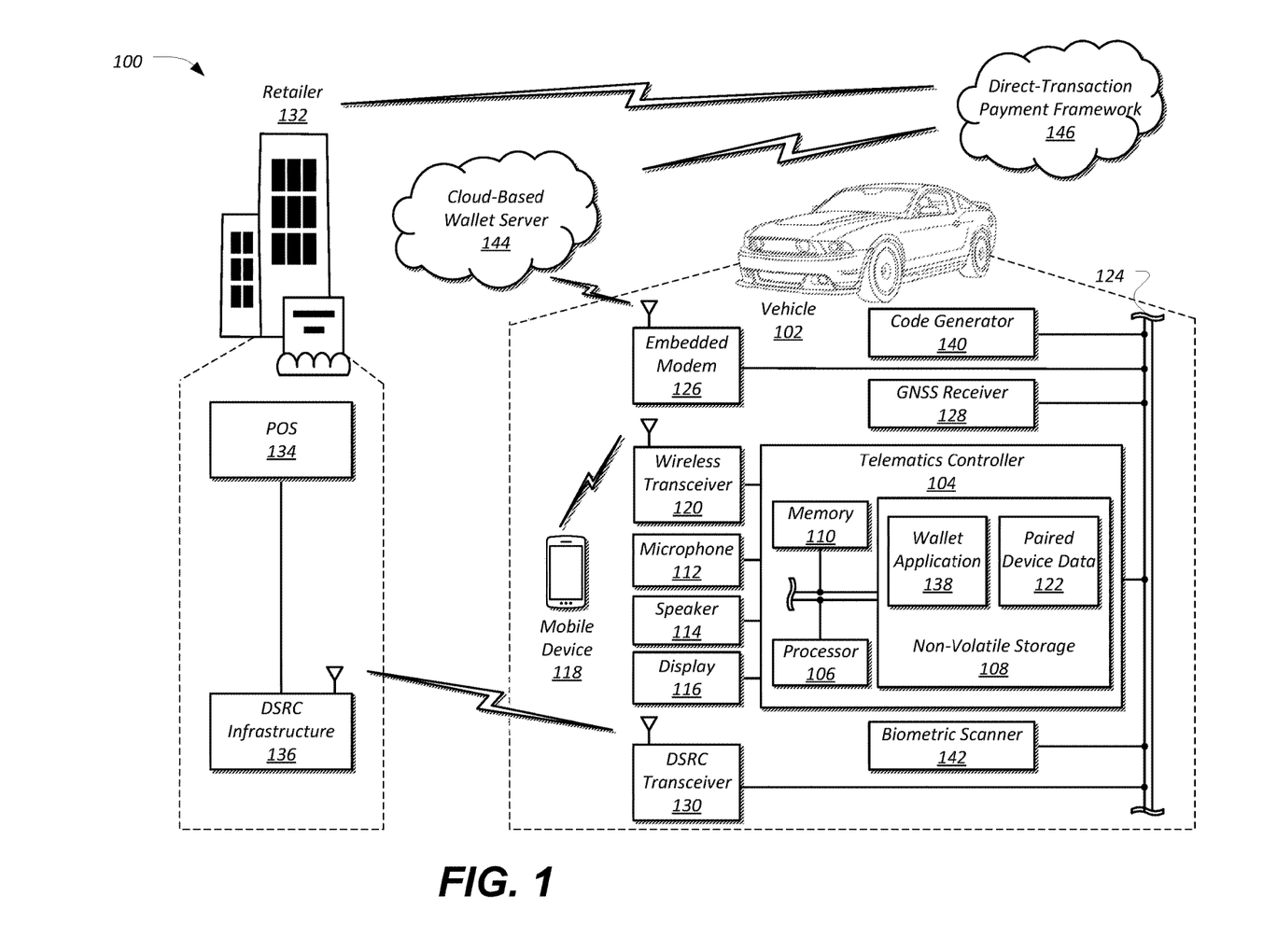
FIG. 1 illustrates an example system for using a vehicle in a wireless payment framework.

FIG. 1 illustrates an example system 100 for vehicle-based wireless payments. Using the system 100, vehicle 102 occupants can perform wireless payment transactions with wireless-enabled retailers 132. Messages between the wireless-enabled retailers 132 and the vehicle 102 may be delivered using communication mechanisms such as Dedicated Short Range Communications (DSRC), Long Range Wi-Fi, BLUETOOTH, or 4G/5G cellular. Example retailers 132 may include toll roads, drive-through restaurants, refueling stations, or parking facilities, groceries stores, pharmacies, and mechanized retailers with pickup windows or curb-side kiosks. To facilitate the transactions, the system 100 may utilize a wallet application 138 installed to the vehicle 102 and a cloud-based wallet server 144 storing payment credentials of the vehicle 102 occupants. Using the wallet application 138, the vehicle 102 occupants may approve the transactions using a human-machine interface of the vehicle 102. Once approved, the transaction may be completed using the cloud-based wallet server 144 and a direct-transaction payment framework 146 that bypasses typical credit card fees. By using the system 100, vehicle occupants can securely complete wireless payment transactions from within their vehicles 102, without the use of cash or credit cards. Further aspects of the system 100 are described in detail below.

The vehicle 102 may be one of various types of passenger vehicles, such as a sedan, a crossover utility vehicle (CUV), a sport utility vehicle (SUV), a truck, a recreational vehicle (RV), or other mobile machine for transporting people or goods. In many cases, the vehicle 102 may be powered by an internal combustion engine. As another possibility, the vehicle 102 may be a hybrid electric vehicle (HEV) powered by both an internal combustion engine and one or more electric motors, such as a series hybrid electric vehicle (SHEV), a parallel hybrid electric vehicle (PHEV), or a parallel/series hybrid electric vehicle (PSHEV). As the type and configuration of vehicle 102 may vary, the capabilities of the vehicle 102 may correspondingly vary. As some other possibilities, vehicles 102 may have different capabilities with respect to passenger capacity, towing ability and capacity, and storage volume. For title, inventory, and other purposes, the vehicle 102 may be associated with a unique identifier, such as a vehicle identification number (VIN).

The telematics controller 104 may be configured to provide telematics services to the vehicle 102. These services may include, as some non-limiting possibilities, navigation, turn-by-turn directions, vehicle health reports, local business search, accident reporting, and hands-free calling. In an example, the telematics controller 104 may include the Ford SYNC system manufactured by The Ford Motor Company of Dearborn, Mich.

The telematics controller 104 may include one or more processors 106 configured to perform instructions, commands, and other routines in support of the processes described herein. Such instructions, and other data, may be maintained in a non-volatile manner using a variety of types of computer-readable storage medium 108. The data may be loaded from the storage medium 108 into a memory 110 to be accessed by the processor 106. The computer-readable storage medium 108 (also referred to as a processor-readable medium or storage) includes any non-transitory medium (e.g., a tangible medium) that participates in providing instructions or other data that may be read by the processor 106 of the telematics controller 104. Computer-executable instructions may be compiled or interpreted from computer programs created using a variety of programming languages and/or technologies, including, without limitation, and either alone or in combination, Java, C, C++, C #, Objective C, Fortran, Pascal, Java Script, Python, Perl, and PL/SQL.

The telematics controller 104 may utilize a voice interface to provide a hands-free interface to the telematics controller 104. The voice interface may support speech recognition from audio received via the microphone 112 according to a grammar of available commands, and voice prompt generation for output via a speaker 114 or other audio output. In some cases, the system may be configured to temporarily mute, fade, or otherwise override an audio source specified by an input selector when an audio prompt is ready for presentation by the telematics controller 104 and music or other audio is selected for playback.

The telematics controller 104 may also receive input from human-machine interface (HMI) controls configured to provide for occupant interaction with the vehicle 102. For instance, the telematics controller 104 may interface with one or more buttons or other HMI controls configured to invoke telematics controller 104 functions (e.g., steering wheel audio buttons, a push-to-talk button, instrument panel controls, etc.). The telematics controller 104 may also drive or otherwise communicate with one or more displays 116 configured to provide visual output to vehicle occupants. In some cases, the display 116 may be a touch screen further configured to receive user touch input, while in other cases the display 116 may be a display only, without touch input capabilities.

The telematics controller 104 may also be configured to communicate with mobile devices 118 of the vehicle occupants. The mobile devices 118 may be any of various types of portable computing device, such as cellular phones, tablet computers, smart watches, laptop computers, portable music players, or other devices capable of communication with the telematics controller 104. In many examples, the telematics controller 104 may include a local wireless transceiver 120 (e.g., a BLUETOOTH module, a ZIGBEE transceiver, a Wi-Fi transceiver, etc.) configured to communicate with a compatible wireless transceiver of the mobile device 118. Additionally or alternately, the telematics controller 104 may communicate with the mobile device 118 over a wired connection, such as via a USB connection between the mobile device 118 and the telematics controller 104.

Occupants of the vehicle 102 or mobile devices 118 having permission to connect to the telematics controller 104 may be identified by the telematics controller 104 according to paired device data 122 maintained in the storage medium 108. The paired device data 122 may indicate, for example, unique device identifiers of mobile devices previously paired with the telematics controller 104 of the vehicle 102, secret information shared between the paired mobile device 118 and the telematics controller 104 such as link keys and/or personal identification numbers (PINs), and most recently used or device priority information. Using the paired device data 122, the telematics controller 104 may automatically reconnect to mobile devices 118 matching the data in the paired device data 122 without user intervention.

The vehicle bus 124 may include various methods of communication available between the telematics controller 104 and other components of the vehicle 102. For instance, the vehicle bus 124 may include one or more of a vehicle controller area network (CAN), an Ethernet network, and a media oriented system transfer (MOST) network.

The embedded modem 126 may be a component of the vehicle 102 configured to facilitate communication by the vehicle 102 over a communications network. The communications network may provide communications services, such as packet-switched network services (e.g., Internet access, VoIP communication services), to devices connected to the communications network. An example of a communications network may include a cellular telephone network. To facilitate the communications over the communications network, the embedded modem 126 may be associated with unique device identifiers (e.g., mobile device numbers (MDNs), Internet protocol (IP) addresses, etc.) to identify the communications of the embedded modem 126 on the communications network as being associated with the vehicle 102. To support the telematics services, the telematics controller 104 may utilize the embedded modem 126 to facilitate networked communication between the vehicle 102 and devices external to the vehicle 102. In other examples, the telematics controller 104 may communicate with the communications network via a network connection of a mobile device 118 connected to the telematics controller 104 via the local wireless transceiver 120.

The global navigation satellite system (GNSS) receiver 128 may be a component of the vehicle 102 used to provide geo-spatial positioning information for the vehicle 102. As some examples, the GNSS receiver 128 may be configured to receive positional data via Global Positioning System (GPS), the GLObal NAvigation Satellite System (GLOASS), and/or the Galileo positioning system.

The DSRC transceiver 130 may be a component of the vehicle 102 configured to facilitate one-way or two-way wireless communication over frequencies and protocols specifically designed for automotive use. In an example, the DSRC transceiver 130 may be configured to facilitate Intelligent Transportation System capabilities. DSRC and its wireless component, wireless access in vehicular environments (WAVE) protocol, operate within a 75-megahertz (MHz) bandwidth of the 5.9 gigahertz (GHz) frequency spectrum band. The allocated bandwidth is generally divided into one control channel (CCH) used to broadcast safety messages and announce available services and four to six service channels (SCHs) used for subsequent communication between the broadcasted service provider and a service user. It should be noted that many examples herein use DRSC, but other medium-to-long-range wireless protocols may additionally or alternately be used, such as Long Range Wi-Fi, BLUETOOTH Low Energy (BLE), or 4G/5G cellular.

The retailers 132 may include establishments for selling consumer goods and/or services to customers who are occupants of the vehicle 102. As some examples, the retailers may include establishments providing services specific to vehicles 102, such as vehicle 102 parking, tolls, or fuel stations. As some other examples, the retailers may include establishments configured to provide goods or services to vehicle 102 occupants as well as non-vehicle customers. For instance, fast-food restaurant retailers 132 may also include shopping areas for customers having exited their vehicles 102.

The equipment of the retailers 132 at which the retail transaction is completed may be referred to as the point of sale (POS) 134. In many stores, the POS 134 is the register or other point at which a customer makes a payment. To use the POS 134, the customer typically must either enter the retailer 132 or access a terminal outside the retailer 132. When performing the retail transaction, the POS 134 provides information to the customer, such as an invoice listing the quantities, price, and descriptions of the goods or services being purchased. Using the POS 134, the customer may physically provide a mechanism for payment to the retailer 132. Example mechanisms of payment include cash, credit cards, debit cards, and pre-paid cards. When the transaction is completed, the POS 134 may provide the customer with a receipt recording the sale of goods or services. A retailer 132 enabling wireless payments may further include DSRC infrastructure 136 in communication with the POS 134. The DSRC infrastructure 136 may be configured to allow the POS 134 of the retailer 132 to wirelessly communicate transaction data with the DSRC transceivers 130 of vehicles 102 in proximity to the retailer 132 over the DSRC communications channel.

The wallet application 138 may be an application installed to the storage medium 108 of the telematics controller 104. When executed by the telematics controller 104, the wallet application 138 may utilize the DSRC transceiver 130 to communicate with the DSRC infrastructure 136 of the retailer 132. For example, the DSRC infrastructure 136 of the retailer 132 may communicate with the vehicle 102 DSRC transceivers 130 to advertise the availability of wireless payments for vehicle 102 transactions. Responsive to the advertisement, the wallet application 138 may direct the DSRC transceiver 130 to connect to the DSRC infrastructure 136 to wirelessly receive the invoice information via DSRC. The wallet application 138 may direct the transient code generator 140 to produce a transient code to be sent to DSRC infrastructure 136 as part of payment initialization. The wallet application 138 may further utilize the speaker 114, displays 116, or other HMI features of the vehicle 102 to display the invoice information in the vehicle 102 to the occupant. An example vehicle 102 HMI is discussed in further detail below with respect to FIGS. 2-3.

The wallet application 138 may be further configured to cause the telematics controller 104 to access the embedded modem 126 to communicate with a cloud-based wallet server 144. The wallet application 138 may further communicate with the cloud-based wallet server 144 to provide the transient code for the particular transaction. The cloud-based wallet server 144 may store payment information for the occupant of the vehicle 102, to allow occupants to complete authorized payments to be credited to the retailer 132. As an example, the cloud-based wallet server 144 may store checking or debit account information, which may be used to perform electronic financial transactions using the Automated Clearing House (ACH) electronic network. ACH is a computer-based clearing and settlement facility established to process the exchange of electronic transactions between participating depository institutions. In many cases, ACH is used for direct debit payments and credits, such as payments of regular consumer bills such as mortgages, loans, utilities, insurance premiums, rents, or payments such as direct deposit, payroll, or vendor payments. ACH may also be used for one-time transactions, such as for electronic commerce.

By using the wallet application 138, the vehicle occupant may choose from the stored payment information to select a payment mechanism to use.

When utilizing ACH, the occupant must authorize the debit of their account for the amount due. Moreover, the authorization must conform to the requirements of the ACH Operating Rules and must be either written and signed, or electronically displayed. Thus, to perform the transaction, the occupant can confirm the transaction using the vehicle 102 HMI. As some examples, the user may press a button on the display 116 or speak a voice command into the microphone 112 to agree to the amount and other information of the displayed invoice.

The vehicle 102 may also include a biometric scanner 142 that may be useful for confirming retail transactions. The biometric scanner 142 may be configured to collect biometric inputs from a user. In one example, the biometric scanner 142 may be a fingerprint scanner configured to read at least one fingerprint or thumbprint of the user (generally referred to herein as a fingerprint). For instance, the biometric scanner 142 may be integrated with a push-button start control, and may be used to confirm occupant identity when starting the vehicle 102. In another example, the biometric scanner 142 may be integrated within the top of a gear shifter of the vehicle 102, or at a location within the dashboard or steering wheel. It should be noted that the fingerprint scanner is merely one example of a biometric scanner 142. As some other possibilities, the biometric scanner 142 may utilize voice print profiles (e.g., via receiving speech from the microphone 112) or retinal scanning, as some other possibilities. Using the biometric scanner 142, the occupant may confirm his or her identity to authenticate with the vehicle 102. The biometric scanner 142 may compare received biometric data with biometric data of the occupant stored to the vehicle 102 (e.g., securely stored to the storage 108 of the telematics controller 104) to determine whether the occupant is a match to an authorized user. By biometrically authenticating with the vehicle 102, the vehicle 102 occupant may reduce potential fraud and confirm the transaction to be performed.

To further ensure security of the transaction, the wallet application 138 may perform additional confirmations. For instance, the wallet application 138 may authenticate the transaction by confirming that the mobile device 118 of the driver as determined from the paired device data 122 is currently connected to the telematics controller 104. As another possibility, the wallet application 138 may confirm, using location data from the GNSS receiver 128, that the vehicle 102 is actually located within a predefined threshold distance to the retailer 132 for which the transaction is being confirmed.

Once the payment source is selected and the transaction is confirmed, the wallet application 138 may use the embedded modem 126 to communicate with the cloud-based wallet server 144 to complete the transaction. For example, the cloud-based wallet server 144 may prepare the ACH payment information and deliver it for ACH submission to the originating depository financial institution (ODFI) by electronic transmission over a secure connection. The ODFI processes the ACH payment information and electronically delivers the information to the ACH network operator, which electronically distributes the ACH items to the customer's bank (RDFI). The ACH network operator debits the user's bank account for the value of the transaction. The cloud-based wallet server 144 may further initiate a secondary transaction to move the funds into an account of the retailer 132.

The wallet application 138 may be informed by the cloud-based wallet server 144 once the transaction is completed, and may receive a receipt for the sale. Thus, by using the DSRC infrastructure 136, the POS 134 can enable initiation of wireless transactions with the vehicle 102, such that the vehicle 102 occupants can complete a purchase without exiting the vehicle 102 or opening a vehicle 102 window.

Moreover, by using ACH as a payment mechanism, the system 100 can bypass credit card interchanges and associated fees. Because these fees are not paid, the cloud-based wallet server 144 can offer incentives to utilize the system 100 to both the in-vehicle occupants and the retailers 132. In an example, the cloud-based wallet server 144 may offer in-vehicle occupant users points computed as a predefined number of basis points of the total transaction amount. These points may be accumulated by the users, and may be redeemed for goods or services or used for making further payments. In another example, the cloud-based wallet server 144 may offer incentives to retailers 132 participating in accepting payments via the system 100. For instance, the retailers 132 may be charged a transaction fee by the cloud-based wallet server 144 that is lower than would otherwise be charged to the retailers 132 for transactions fulfilled using customer charge cards.

It should be noted that the illustrated system 100 is merely an example, and more, fewer, and/or differently located elements may be used. For example, some vehicle functions described as discrete modules may share physical hardware, firmware, and/or software, such that the functionality from multiple modules may be integrated into a single module. Or, functionality described as being within a single module may be distributed across a plurality of modules.

Figure 2:
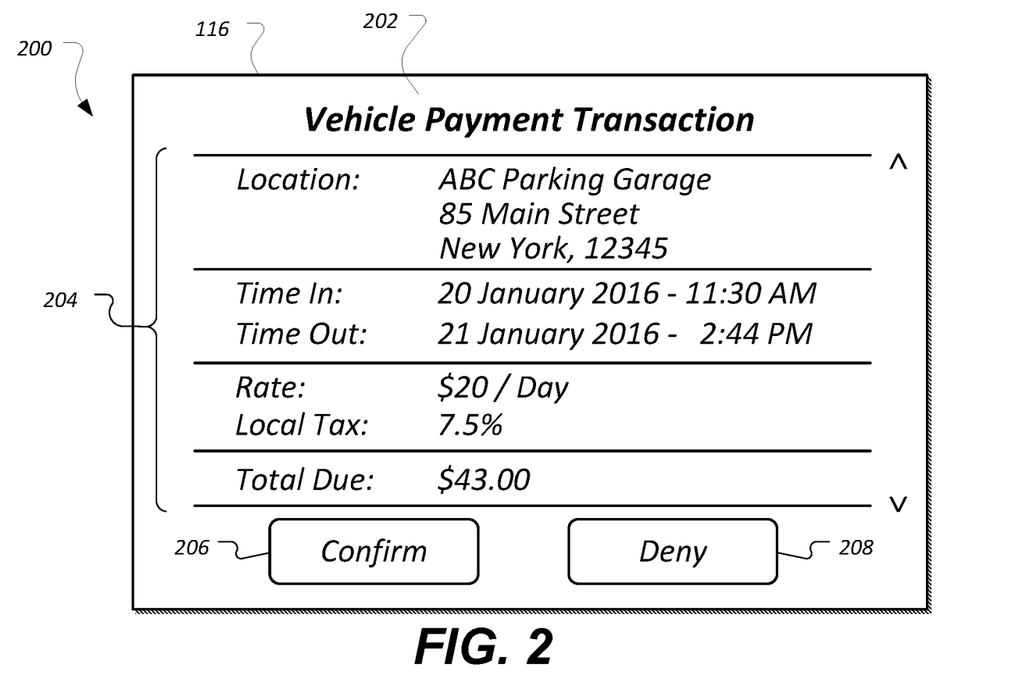
FIG. 2 illustrates an example human-machine interface of the vehicle for initiating a wireless payment transaction.

FIG. 2 illustrates an example HMI 200 of the vehicle 102 for initiating a wireless payment transaction. In an example, the HMI 200 may be provided to the display 116 by the wallet application 138 responsive to data for a pending transaction received from the retailer 132 via DSRC. For instance, the DSRC transceiver 130 of the vehicle 102 may receive a communication from the DSRC infrastructure 136 of the retailer 132 advertising availability of wireless payments. Responsive to receiving the communication, the telematics controller 104 may activate the wallet application 138 to allow the wallet application 138 to inform the user of the payment request.

As shown, the HMI 200 displays a title 202 indicating that a vehicle 102 payment transaction is pending. The HMI 200 further displays payment details 204 of the pending transaction based on invoice information received from the retailer 132. These details may include, as some examples, information related to the location of the retailer 132, a description of the goods or services being purchased, cost information for the goods or services, and a total amount due for payment. The HMI 200 may further include controls through which the vehicle 102 occupant approve the transaction. As illustrated, the HMI 200 includes a confirm control 206 that, when selected by the occupant, directs the wallet application 138 to proceed with the transaction, and a deny control 208 that, when selected by the occupant, directs the wallet application 138 to reject the transaction. It should be noted that if the transaction is rejected, the occupant may still pay the retailer 132 for the transaction using a payment mechanism other than via the vehicle 102.

Figure 3:
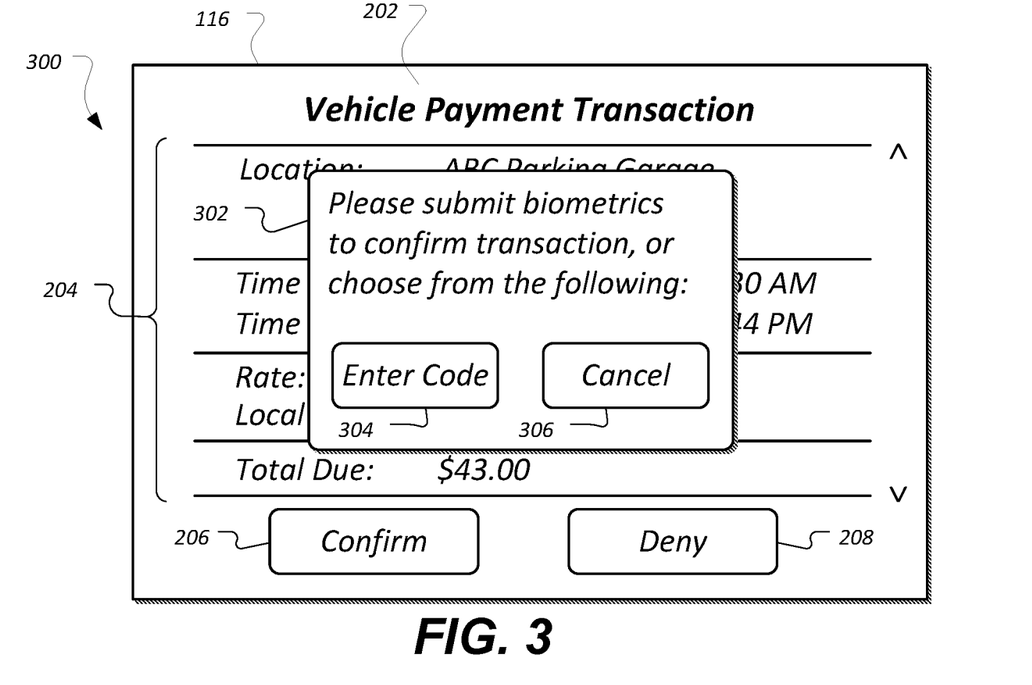
FIG. 3 illustrates an example human-machine interface of the vehicle for confirming the wireless payment transaction.

FIG. 3 illustrates an example HMI 300 of the vehicle 102 for confirming the wireless payment transaction. In an example, the HMI 300 may be provided to the display 116 by the wallet application 138 responsive to occupant selection of the confirm control 206. As shown, the HMI 300 includes a prompt 302 requesting that the occupant provide biometrics in support of authentication of the user for performing the transaction.

To respond to the prompt 302, the occupant may utilize the biometric scanner 142 of the vehicle 102 to confirm that the occupant is authorized to use the wireless payment services of the vehicle 102. As one possibility, the biometric scanner 142 may be a fingerprint scanner, and the occupant may provide his or her fingerprint to provide his or her identity. As another possibility, the biometric scanner 142 may be a voice print recognition scanner, and the occupant may speak a phrase to prove his or her identity. As a further possibility, the biometric scanner 142 may be a retina scanner, and the occupant may provide his or her eye for scanning. The biometric scanner 142 may be implemented as integral part of the vehicle 102 to prevent mobile device cloning or spoofing. For instance, the biometric scanner 142 may be paired with a processor of the vehicle 102 to ensure that the biometric scanner 142 itself has not been spoofed or tampered with. In some examples, using both the biometric scanner 142 and entering a security code into the telematics provides an added layer of security. The security code could be entered via voice active commands, or via touchscreen input, as some examples.

In some cases, the occupant may prefer to enter credentials to confirm the transaction. As an example, the prompt 302 may provide an enter code control 304 that, when selected by the occupant, allows the occupant to enter a personal identification number (PIN) or other access code that can be verified by the wallet application 138 to allow the transaction. Or, if the occupant wishes to cancel the transaction, the occupant may instead select the cancel control 306.

It should be noted that the illustrated HMIs 200 and 300 are merely examples, and more, fewer, and/or differently located controls or user interfaces may be used. For example, voice commands may additionally or alternately be used to control the HMI to instruct the user of the invoice details and/or to receive confirmation of the transaction.

Figure 4:
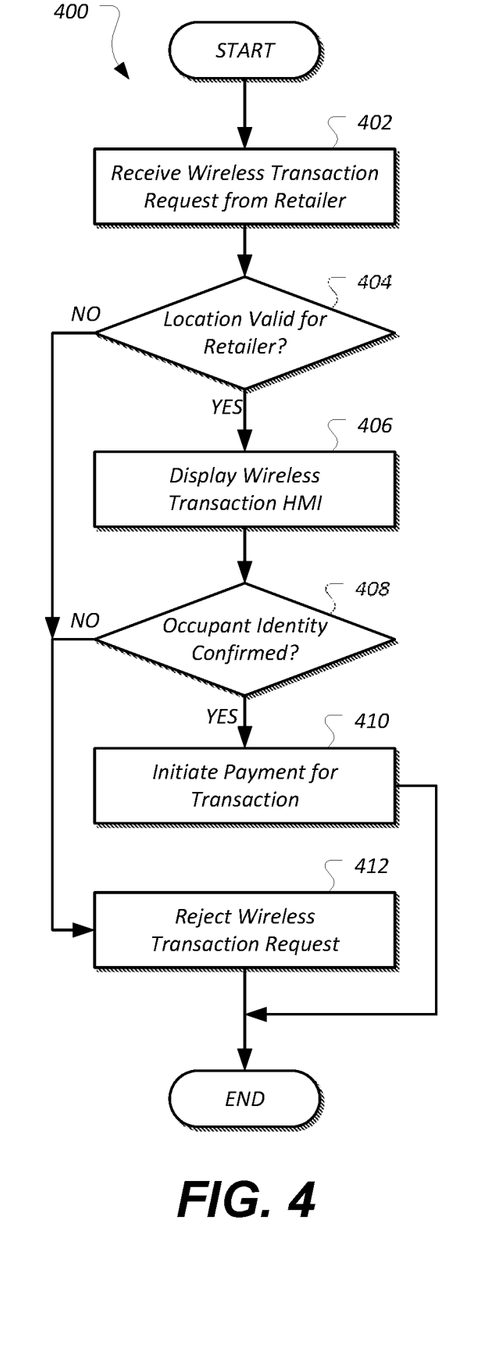
FIG. 4 illustrates an example process for requesting a wireless payment transaction from a vehicle.

FIG. 4 illustrates an example process 400 for requesting a payment transaction by the vehicle 102 with a retailer 132 using the wireless payment framework system 100. In an example, the process 400 may be performed using the wallet application 138 installed to the telematics controller 104 of the vehicle 102.

At operation 402, the vehicle 102 receives a wireless transaction request from a retailer 132 including the vehicle-generated transient code. In an example, the vehicle 102 occupant may enter a payment booth for a toll road or toll bridge. In another example, the vehicle 102 occupant may initiate a payment transaction for food at a drive-thru restaurant. In yet a further example, the vehicle 102 occupant may enter or exit a pay-for-parking lot. The DSRC infrastructure 136 of the retailer 132 may communicate with the vehicle 102 DSRC transceivers 130 to advertise the availability of wireless vehicle 102 payments. Responsive to the advertisement, the wallet application 138 may direct the DSRC transceiver 130 to connect to the DSRC infrastructure 136 to wirelessly receive the wireless transaction request via DSRC. In an example, the wireless transaction request may include invoice information for the requested transaction.

At operation 404, the vehicle 102 confirms the user location as being valid for the retailer 132. For example, the wallet application 138 may determine a location of the retailer 132 and utilize positioning data received from the GNSS receiver 128 to confirm that the vehicle 102 is located at the retailer 132. Additionally or alternatively, the wallet application 138 may utilize positioning features of a mobile device 118 connected to the telematics controller 104 as an additional or alternate confirmation of the location of the vehicle 102. The location of the retailer 132 may be determined, in an example, by looking up an identifier of the retailer 132 included in the wireless transaction request in a database of wireless-enabled retailers 132 to determine the street address or other location of the retailer 132. As one possibility, the cloud-based wallet server 144 or another server may maintain the database of retailer 132 locations. If the vehicle 102 is confirmed to be at the location of the retailer, control passes to operation 406. Otherwise, control passes to operation 410.

At operation 406, the vehicle 102 provides a HMI to the vehicle 102 occupant. The HMI may inform the occupant of the requested transaction. The HMI may include invoice information for the transaction, such as quantities, price, and descriptions of the goods or services to be purchased. An example HMI for informing the occupant regarding the transaction is discussed in detail above with respect to FIG. 2.

At operation 408, the vehicle 102 confirms the occupant identity. In an example, the occupant may provide biometric information to authorize the transaction using the biometric scanner 142 of the vehicle 102. In another example, the occupant may provide the biometric information using a fingerprint or other biometric device of a mobile device 118 connected to the vehicle 102. Or, the occupant may authenticate by entering a PIN or other code. An example HMI for confirming the occupant regarding the transaction is discussed in detail above with respect to FIG. 3. Additionally or alternatively, the occupant may be confirmed using the paired device data 122 to ensure that the mobile device 118 of the driver is currently connected to the vehicle 102 as the driver device. It should be noted that these confirmations are merely examples, and other confirmations of identity, such as seat settings for height and weight authentication may be additionally or alternatively used. If the occupant identity is confirmed, control passes to operation 410. If not, or if the transaction is canceled by the occupant, control passes to operation 412.

At operation 410, the vehicle 102 sends a payment initiation request to the cloud-based wallet server 144 for processing. Further aspects of the processing of the payment are discussed in detail below with respect to FIG. 5.

At operation 412, the vehicle 102 rejects the wireless transaction request. When the request is rejected, the occupant may continue to perform the transaction without using the wireless payment system 100, or may abandon the transaction. After operation 412, the process 400 ends.

Figure 5:
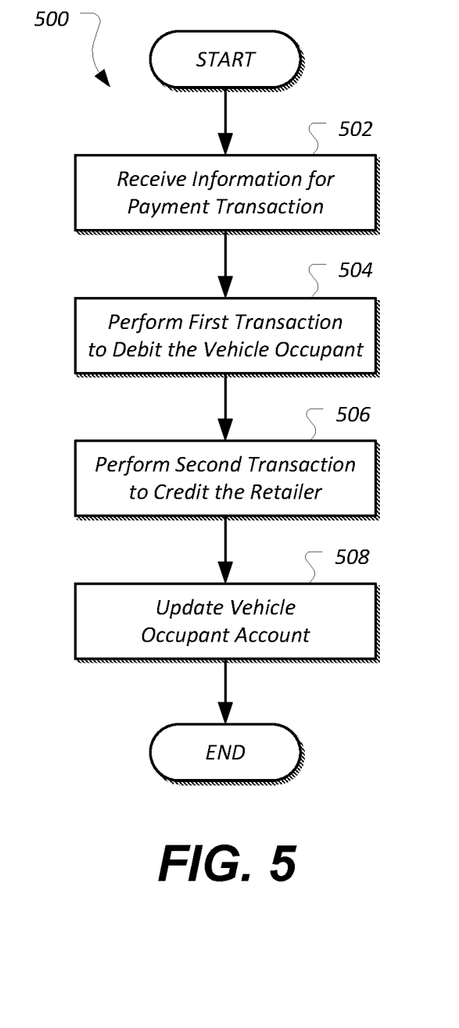
FIG. 5 illustrates an example process for performing the wireless payment transaction.

FIG. 5 illustrates an example process 500 for performing the wireless payment transaction. The process 500 may be performed, in an example, by the cloud-based wallet server 144, and direct-transaction payment framework 146 of the system 100 in communication with the vehicle 102.

At operation 502, the cloud-based wallet server 144 receives a request from the vehicle 102 to perform the wireless payment transaction. In an example, the request may be sent from the vehicle 102 at operation 410 of the process 400 discussed above.

At operation 504, the cloud-based wallet server 144 performs a first transaction to debit the vehicle 102 occupant. For example, the cloud-based wallet server 144 may prepare the ACH payment information and deliver it to the direct-transaction payment framework 146 for ACH submission to the ODFI by electronic transmission over a secure connection. The ODFI processes the ACH payment information and electronically delivers the information to the ACH network operator, which electronically distributes the ACH items to the RDFI. The ACH network operator accordingly debits the user's bank account for the value of the transaction such that a single ACH transfer may be made from the vehicle 102 occupant as a sum of the transactions during the batch time period to reduce interchange fees. While the user's bank may process the multiple transactions as a single withdrawal, the bank may indicate on the customer's bill the details of the multiple transactions, to facilitate the user's statement reconciliation process. In an example, the batch timeframe may be daily.

At operation 506, the cloud-based wallet server 144 performs a second transaction to credit the retailer 132. For example, the cloud-based wallet server 144 may prepare a second set of ACH payment information and deliver it to the direct-transaction payment framework 146 to credit the account of the retailer 132. As with the vehicle transactions, the retailer 132 transactions may be batched together (e.g., daily), such that a single ACH transfer may be made to the retailer 132 as a sum of the transactions for the retailer during the batch time period.

At operation 508, the cloud-based wallet server 144 updates the user's account. For example, the cloud-based wallet server 144 may update the user's account to indicate information such as whether or not the transaction was completed successfully. For pre-paid or credit-limited accounts, the update may include a remaining balance on the user's wallet account. The update may also indicate any vehicle-payment points earned through performance of the transaction. For example, the user may earn points computed as a predefined number of basis points of the total transaction amount. These points may be accumulated by the users, and may be redeemed for goods or services, or used for making further payments. After operation 508, the process 500 ends.

Variations on the system 100 are possible. As an example, while in the illustrated examples, the wallet application 138 is described in terms of transactions initiated by a retailer 132, in other examples the transactions may be initiated by other applications installed to the telematics controller 104 or the mobile device 118. For example, the payment services of the wallet application 138 may be made available for in-app purchases for the other applications.

The processes, methods, or algorithms disclosed herein may be deliverable to or implemented by a processing device, controller, or computer, which may include any existing programmable electronic control unit or dedicated electronic control unit. Similarly, the processes, methods, or algorithms may be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms may also be implemented in a software executable object. Alternatively, the processes, methods, or algorithms may be embodied in whole or in part using suitable hardware components, such as Application Specific Integrated Circuits (ASICs), Field-Programmable Gate Arrays (FPGAs), state machines, controllers or other hardware components or devices, or a combination of hardware, software, and firmware components.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to, cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle comprising:
    an embedded modem for communication with a wallet server storing payment credentials of an occupant of the vehicle;
    a wireless transceiver for communication with a retailer; and
    a processor programmed to
        receive, from wireless infrastructure of the retailer via the wireless transceiver, an advertisement indicating availability of wireless payments for vehicle transactions,
        responsive to receipt of the advertisement, wirelessly connect to the wireless infrastructure of the retailer via the wireless transceiver, including to utilize a transient code generator to produce a transient code and to send the transient code to the retailer as part of payment initialization,
        receive a wireless transaction request from the retailer via the wireless connection, the wireless transaction request including the transient code for the transaction,
        validate the vehicle is located in proximity to the retailer responsive to receipt of the wireless transaction request,
        display a wireless transaction user interface responsive to the vehicle being validated as located in proximity to the retailer,
        receive confirmation of the request from a vehicle occupant responsive to a prompt shown by the wireless transaction user interface to authorize a debit of an Automated Clearing House (ACH) account,
        responsive to confirmation of the request, initiate a payment for the transaction with the wallet server including providing the transient code in a wireless transaction request to the wallet server, the wallet server completing the payment using the payment credentials of the occupant via the ACH electronic network, bypassing credit card interchange fees but charging a transaction fee for the payment by a remote server to fund reward points computed as a predefined number of basis points of the payment, and
        receive, from the remote server, the points for use in further wireless payments made via the remote server.

2. The vehicle of claim 1, wherein the wireless transceiver is configured to communicate with the retailer via Dedicated Short Range Communications (DSRC).

3. The vehicle of claim 1, wherein the retailer is one or more of a toll road, a drive-through restaurant, a refueling station, or a parking facility.

4. The vehicle of claim 1, wherein to receive confirmation of the request from the vehicle occupant includes to:
    receive biometric data from a biometric sensor as confirmation of the request;
    compare the received biometric data with stored biometric data of the occupant maintained by the vehicle; and
    determine whether the occupant is a match to an authorized user responsive to the comparison.

5. The vehicle of claim 4, wherein the biometric sensor includes one or more of a fingerprint sensor, a retina scanner, or a voice-print recognizer.

6. The vehicle of claim 1, wherein to validate that the vehicle is located in proximity to the retailer includes to:
    receive location data from a global navigation satellite system receiver;
    determine a location of the retailer; and
    confirm that the vehicle is located within a predefined threshold distance to the retailer.

7. The vehicle of claim 4, wherein the biometric sensor is integrated with a top of a gear shifter of the vehicle.

8. The vehicle of claim 4, wherein the biometric sensor is integrated with a push-button start control of the vehicle, wherein the biometric sensor captures the occupant identity for use confirming the request responsive to a press of the start control to start the vehicle.

9. The vehicle of claim 1, further comprising the remote server, wherein the server is configured to batch a plurality of transactions of the vehicle occupant over a batch time period into a single transaction, such that a single transaction is made for the vehicle occupant as a sum of payment amounts of the plurality of transactions during the batch time period.

10. The vehicle of claim 9, wherein the batch time period is daily.

11. A non-transitory computer-readable medium, comprising instructions that, when executed by a processor of a vehicle, are configured to cause the processor to:
    receive, from wireless infrastructure of a retailer via a wireless transceiver of the vehicle, an advertisement indicating availability of wireless payments for vehicle transactions, the wireless payments to be performed using a wallet server storing payment credentials of an occupant of the vehicle;
    responsive to receipt of the advertisement, wirelessly connect to the wireless infrastructure of the retailer via the wireless transceiver, including to utilize a transient code generator to produce a transient code and to send the transient code to the retailer as part of payment initialization;
    receive a wireless transaction request from a retailer over a Dedicated Short Range Communication (DSRC) channel, the wireless transaction request including the transient code for the transaction;
    responsive to receipt of the wireless transaction request, validate that the vehicle is located in proximity to the retailer according to global navigation satellite system (GNSS) location data and an identified location of the retailer;

display a wireless transaction user interface responsive to the vehicle being located in proximity to the retailer to authorize a debit of an Automated Clearing House (ACH) account;

receive confirmation of the request from a vehicle occupant, responsive to a prompt shown by the wireless transaction user interface, by confirming at least one biometric of the occupant;

responsive to confirmation of the request, initiate payment for the transaction with the wallet server including providing the transient code in a wireless transaction request to the wallet server, the wallet server completing the payment using the payment credentials of the occupant via ACH, bypassing credit card interchange fees but charging a transaction fee for the payment by a remote server to fund reward points computed as a predefined number of basis points of the payment; and receive, from the remote server, the points for use in further wireless payments made via the remote server.

* * * * *